(12) United States Patent
Huang et al.

(10) Patent No.: US 11,909,537 B2
(45) Date of Patent: Feb. 20, 2024

(54) DATA TRANSMISSION METHOD AND APPARATUS

(71) Applicant: HUAWEI TECHNOLOGIES CO., LTD., Shenzhen (CN)

(72) Inventors: Chenji Huang, Wuhan (CN); Luyao Hu, Wuhan (CN); Wangsheng Zhao, Dongguan (CN); Yiming Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 343 days.

(21) Appl. No.: 17/477,617

(22) Filed: Sep. 17, 2021

(65) Prior Publication Data
US 2022/0014319 A1 Jan. 13, 2022

Related U.S. Application Data

(63) Continuation of application No. PCT/CN2019/079098, filed on Mar. 21, 2019.

(51) Int. Cl.
*H04L 1/1867* (2023.01)
*H04L 1/1803* (2023.01)
*H04W 68/00* (2009.01)

(52) U.S. Cl.
CPC .......... *H04L 1/1896* (2013.01); *H04L 1/1803* (2013.01); *H04W 68/005* (2013.01)

(58) Field of Classification Search
CPC ....... H04L 1/1896; H04L 1/1803; H04L 1/08; H04L 1/18; H04L 5/001; H04L 1/1883;
(Continued)

(56) References Cited

U.S. PATENT DOCUMENTS

| | | | |
|---|---|---|---|
| 8,599,734 B1 | 12/2013 | Ram et al. | |
| 2013/0083783 A1* | 4/2013 | Gupta | H04W 88/16 370/338 |

(Continued)

FOREIGN PATENT DOCUMENTS

| | | |
|---|---|---|
| CN | 1549530 A | 11/2004 |
| CN | 102843302 A | 12/2012 |

(Continued)

OTHER PUBLICATIONS

R2-1702642, Nokia et al., "Duplication Impacts to PDCP," 3GPP TSG-RAN WG2 Meeting #97bis, Spokane, USA, Apr. 3-7, 2017, 5 pages.

*Primary Examiner* — Nimesh Patel
(74) *Attorney, Agent, or Firm* — Rimon PC

(57) ABSTRACT

This application provides a data transmission method and related apparatus. The data transmission method is applied to a communications system. An access point in the communications system includes a first communications apparatus and a second communications apparatus, and a station in the communications system includes a third communications apparatus and a fourth communications apparatus. The data transmission method includes that after failing to send a first data frame to the third communications apparatus through a first channel, the first communications apparatus retransmits the first data frame, and sends a same second data frame to the second communications apparatus. The first communications apparatus receives a first notification message sent by the second communications apparatus. The first communications apparatus stops, in response to the first notification message, sending the first data frame.

9 Claims, 9 Drawing Sheets

(58) Field of Classification Search
CPC ..... H04L 5/0032; H04L 5/0053; H04L 69/14;
H04L 67/60; H04L 2001/0093; H04L
2001/0097; H04L 45/24; H04L 45/306;
H04L 63/18; H04L 5/0055; H04L 1/00;
H04L 1/0003; H04L 1/0025; H04L
1/1812; H04L 1/1819; H04L 5/14; H04L
1/1858; H04L 1/1816; H04L 41/0663;
H04L 41/0668; H04L 41/0816; H04L
41/082; H04L 45/22; H04L 45/28; H04W
68/005; H04W 88/10; H04W 52/0241;
H04W 88/06; H04W 88/08; H04W 36/14;
H04W 36/0066; H04W 84/045; H04W
36/005; H04W 52/241; H04W 52/245;
H04W 92/02; H04W 60/005; H04W
48/04; H04W 48/18; H04W 76/10; H04W
36/0022; H04W 36/0027; H04W 80/02;
H04W 88/18; H04W 88/085; H04W
92/10; H04W 36/18; H04W 72/21; H04W
72/23; H04W 76/20; H04W 8/08; H04W
36/08; H04W 72/12; H04W 72/20; H04W
36/0079; H04W 36/06; H04W 52/346;
H04W 24/04; H04W 28/0236; Y02D
30/70; Y02D 10/00; Y02D 30/00; H04M
3/42246; H04M 2207/20; H04M
2203/1091; H04M 7/006; H04M 1/6066;
H04M 2207/18; H04M 2207/185; H04M
3/42263

See application file for complete search history.

(56) References Cited

U.S. PATENT DOCUMENTS

| | | | |
|---|---|---|---|
| 2013/0102313 A1* | 4/2013 | Tinnakornsrisuphap | ................... H04W 36/22 455/436 |
| 2014/0254349 A1 | 9/2014 | Jia et al. | |
| 2016/0278138 A1* | 9/2016 | Chen | ................... H04W 76/15 |
| 2016/0323881 A1 | 11/2016 | Bhora et al. | |
| 2016/0380727 A1 | 12/2016 | Ryu et al. | |
| 2017/0149547 A1 | 5/2017 | Kim et al. | |
| 2017/0164218 A1 | 6/2017 | Ni et al. | |
| 2018/0027490 A1* | 1/2018 | Liu | ................... H04B 7/18532 370/311 |
| 2018/0309660 A1 | 10/2018 | Loehr et al. | |
| 2020/0382243 A1* | 12/2020 | Li | ................... H04L 1/1685 |

FOREIGN PATENT DOCUMENTS

| | | |
|---|---|---|
| CN | 103888995 A | 6/2014 |
| CN | 104797011 A | 7/2015 |
| CN | 105430674 A | 3/2016 |
| CN | 105450367 A | 3/2016 |
| CN | 107302774 A | 10/2017 |
| CN | 107959555 A | 4/2018 |
| CN | 109151958 A | 1/2019 |
| WO | 2018202933 A1 | 11/2018 |

* cited by examiner

DATA TRANSMISSION METHOD AND APPARATUS

CROSS-REFERENCE TO RELATED APPLICATIONS

This application is a continuation of International Application No. PCT/CN2019/079098, filed on Mar. 21, 2019, the disclosure of which is hereby incorporated by reference in its entirety.

TECHNICAL FIELD

This application relates to the field of communications technologies, and in particular, to a data transmission method and an apparatus.

BACKGROUND

An access point (AP) communicates with a station (STA) by using a Wireless Fidelity (Wi-Fi) link. After successfully receiving a data frame sent by a transmit end, a receive end returns an acknowledgment (ACK) frame to the transmit end, where the ACK frame includes a bitmap that indicates which data frames are successfully received and which data frames are not successfully received. After receiving the ACK frame, the AP sends, again, the data frames that were not successfully received, to implement retransmission.

However, the receive end forwards only sequential data frames to a kernel. If a data frame fail to be received, an empty data frames is generated for this missing data frame. In this case, the receive end needs to wait for the missing data frame to be retransmitted. Once the retransmitted data frame is received, the receive end supplements the empty data frame with the properly received data frame and forwards the received data frames to the kernel in sequence. In this case, even if subsequent data frames have been properly received by the receive end, data frames can be forwarded to the kernel only after preceding data frames have been forwarded. This causes latency in data transmission which would lead to service interference, such frame freezing, artifacts, frame dropping, or other phenomena in videos and games. The result is deteriorated user experience.

SUMMARY

This application provides a data transmission method and an apparatus for reducing a latency and a packet loss in data transmission to improve reliability and real-time performance of data transmission on a wireless link.

According to a first aspect, this application provides a data transmission method. The method may be applied to an AP in a communications system, and a first communications apparatus and a second communications apparatus are disposed in the AP. Further, the communications system may further include a STA. A third communications apparatus and a fourth communications apparatus are also disposed in the STA. The third communications apparatus may establish a first channel with the first communications apparatus, and the fourth communications apparatus may establish a second channel with the second communications apparatus. In this way, the STA may perform wireless communication with the AP through the first channel and the second channel. In this application, the first channel and the second channel are channels in different frequency bands. In this case, the data transmission method may include: After failing to send a first data frame to the third communications apparatus through the first channel, the first communications apparatus retransmits the first data frame, and sends a second data frame to the second communications apparatus, where the first data frame and the second data frame are a same data frame. The first communications apparatus receives a first notification message sent by the second communications apparatus, where the first notification message indicates that the second communications apparatus successfully sends the second data frame to the fourth communications apparatus through the second channel. The first communications apparatus stops, in response to the first notification message, sending the first data frame.

In this application, the same data frame is sent through two channels between the AP and the STA, so that when one channel is blocked, the STA can still receive data through the other channel. In this way, the anti-interference capability of wireless transmission is enhanced, the transmission latency and packet loss are reduced, and the reliability and real-time performance of data transmission on a wireless link are improved.

According to the first aspect, in some possible implementations, that the first communications apparatus stops, in response to the first notification message, sending the first data frame includes: The first communications apparatus deletes, in response to the first notification message, the first data frame in a sending queue corresponding to the first communications apparatus; or the first communications apparatus prevents, in response to the first notification message, the first data frame from being retransmitted on the second channel.

According to the first aspect, in some possible implementations, the method further includes: The first communications apparatus receives the first data frame sent by a kernel of the AP. The first communications apparatus adds a first identifier to the first data frame, where the first identifier uniquely identifies the first data frame, and the first identifier of the first data frame is the same as a second identifier of the second data frame.

According to the first aspect, in some possible implementations, the first identifier is a sequence number of the first data frame.

According to a second aspect, this application provides a data transmission method. The method may be applied to an AP in a communications system, and a first communications apparatus and a second communications apparatus are disposed in the AP. Further, the communications system may further include a STA. A third communications apparatus and a fourth communications apparatus are also disposed in the STA. The third communications apparatus may establish a first channel with the first communications apparatus, and the fourth communications apparatus may establish a second channel with the second communications apparatus. In this way, the STA may perform wireless communication with the AP through the first channel and/or the second channel. In this application, the first channel and the second channel are channels in different frequency bands. In this case, the data transmission method may include: The second communications apparatus receives a second data frame, where the second data frame is sent by the first communications apparatus when the first communications apparatus retransmits a first data frame to the third communications apparatus through the first channel, and the first data frame and the second data frame are a same data frame. The second communications apparatus sends the second data frame to the fourth communications apparatus through the second channel. The second communications apparatus receives a first acknowledgment message from the fourth communications apparatus through the second channel, where the first acknowledgment message indicates that the fourth communications apparatus receives the second data frame through the second channel. The second communications apparatus sends a first notification message to the first communications apparatus in response to the first acknowledgment message, where the first notification message is used to instruct the first communications apparatus to stop sending the first data frame.

In this application, the AP sends the same data frame to the STA through two channels between the AP and the STA. In this case, when one channel is blocked, the STA can still receive data through the other channel. In this way, the anti-interference capability of wireless transmission is enhanced, the latency and packet loss are reduced, and the reliability and real-time performance of data transmission on a wireless link are improved.

According to a third aspect, this application provides a data transmission method. The method may be applied to an AP in a communications system, and a first communications apparatus and a second communications apparatus are disposed in the AP. Further, the communications system may further include a STA. A third communications apparatus and a fourth communications apparatus are also disposed in the STA. The third communications apparatus may establish a first channel with the first communications apparatus, and the fourth communications apparatus may establish a second channel with the second communications apparatus. In this way, the STA may perform wireless communication with the AP through the first channel and/or the second channel. In this application, the first channel and the second channel are channels in different frequency bands. In this case, the data transmission method may include: The first communications apparatus receives a first data frame that is sent by a kernel of the AP while the kernel sends a second data frame to the second communications apparatus, where the first data frame and the second data frame are a same data frame. The first communications apparatus sends the first data frame to the third communications apparatus through the first channel. The first communications apparatus receives a first notification message sent by the second communications apparatus, where the first notification message indicates that the second communications apparatus successfully sends the second data frame to the fourth communications apparatus through the second channel. The first communications apparatus stops, in response to the first notification message, sending the first data frame.

In this application, the AP sends the same data frame to the STA through two channels between the AP and the STA. In this case, when one channel is blocked, the STA can still receive data through the other channel. In this way, the anti-interference capability of wireless transmission is enhanced, the latency and packet loss are reduced, and the reliability and real-time performance of data transmission on a wireless link are improved.

According to the third aspect, in some possible implementations, that the first communications apparatus stops, in response to the first notification message, sending the first data frame includes: The first communications apparatus deletes, in response to the first notification message, the first data frame in a sending queue corresponding to the first communications apparatus; or the first communications apparatus stops, in response to the first notification message, the first data frame from being retransmitted on the second channel.

According to the third aspect, in some possible implementations, after the first communications apparatus sends the first data frame to the third communications apparatus through the first channel, the method further includes: The first communications apparatus receives a second acknowledgment message from the third communications apparatus through the first channel, where the second acknowledgment message indicates that the third communications apparatus receives the first data frame through the first channel. The first communications apparatus sends a second notification message to the second communications apparatus in response to the second acknowledgment message, where the second notification message is used to instruct the second communications apparatus to stop sending the second data frame.

According to the third aspect, in some possible implementations, before the first communications apparatus sends the first data frame to the third communications apparatus through the first channel, the method further includes: The first communications apparatus adds a first identifier to the first data frame, where the first identifier uniquely identifies the first data frame, and the first identifier of the first data frame is the same as a second identifier of the second data frame.

According to the third aspect, in some possible implementations, the first identifier is a sequence number of the first data frame.

According to a fourth aspect, this application provides a data transmission method. The method may be applied to a STA in a communications system, and a third communications apparatus and a fourth communications apparatus are disposed in the STA. Further, the communications system may further include an AP. A first communications apparatus and a second communications apparatus are also disposed in the AP. The first communications apparatus may establish a first channel with the third communications apparatus, and the second communications apparatus may establish a second channel with the fourth communications apparatus. In this way, the STA may perform wireless communication with the AP through the first channel and/or the second channel. In this application, the first channel and the second channel are channels in different frequency bands. In this case, the data transmission method may include: The fourth communications apparatus receives a second data frame from the second communications apparatus in the AP through the second channel. The fourth communications apparatus sends a first acknowledgment message to the second communications apparatus through the second channel, and forwards the received second data frame to a kernel of the STA.

In this application, the AP sends the same data frame to the STA through the two channels between the AP and the STA. In this case, when one channel is blocked, the STA can still receive data through the other channel. In this way, an anti-interference capability of wireless transmission is enhanced, a latency and a packet loss are reduced, and then reliability and real-time performance of data transmission on a wireless link are improved.

According to the fourth aspect, in some possible implementations, after the fourth communications apparatus receives the second data frame from the second communications apparatus in the AP through the second channel, the method further includes: The fourth communications apparatus sends a third notification message to the third communications apparatus, where the third notification message is used to instruct the third communications apparatus to discard the first data frame received through the first channel.

According to the fourth aspect, in some possible implementations, the method further includes: The fourth communications apparatus receives a fourth notification message from the third communications apparatus, where the fourth notification message indicates that the third communications apparatus has received the first data frame. The fourth communications apparatus controls, in response to the fourth notification message, to discard the second data frame when receiving the second data frame.

According to the fourth aspect, in some possible implementations, that the fourth communications apparatus forwards the received second data frame to a kernel of the STA includes: The fourth communications apparatus deletes a second identifier of the second data frame, where the second identifier uniquely identifies the second data frame. The fourth communications apparatus forwards the second data frame obtained after the deletion to the kernel.

According to the fourth aspect, in some possible implementations, the second identifier is a sequence number of the second data frame.

According to a fifth aspect, this application provides a communications apparatus, including a first transceiver module, configured to retransmit a first data frame after failing to send the first data frame to a third communications apparatus of a STA through a first channel; a second transceiver module, configured to send a second data frame to a second communications apparatus of an AP, where the first data frame and the second data frame are a same data frame; and further configured to receive a first notification message sent by the second communications apparatus, where the first notification message indicates that the second communications apparatus successfully sends the second data frame to a fourth communications apparatus of the STA through a second channel, and the first channel and the second channel are channels in different frequency bands; and a first control module, configured to stop, in response to the first notification message, sending the first data frame.

According to the fifth aspect, in some possible implementations, the first control module is configured to delete, in response to the first notification message, the first data frame in a sending queue corresponding to the communications apparatus; or the first control module is configured to prevents, in response to the first notification message, the first data frame from being retransmitted on the second channel.

According to the fifth aspect, in some possible implementations, the apparatus further includes: a first receiving module, configured to: receive the first data frame sent by a kernel of the AP, and add a first identifier to the first data frame, where the first identifier uniquely identifies the first data frame, and the first identifier of the first data frame is the same as a second identifier of the second data frame.

According to a sixth aspect, this application provides a communications apparatus, including: a third transceiver module, configured to receive a second data frame, where the second data frame is sent by a first communications apparatus of an AP when a first data frame is retransmitted to a third communications apparatus of a STA through a first channel, and the first data frame and the second data frame are a same data frame; a fourth transceiver module, configured to send the second data frame to a fourth communications apparatus of the STA through a second channel; and further configured to receive a first acknowledgment message from the fourth communications apparatus through the second channel, where the first acknowledgment message indicates that the fourth communications apparatus receives the second data frame through the second channel, and the first channel and the second channel are channels in different frequency bands; and a second control module, configured to send a first notification message to the first communications apparatus in response to the first acknowledgment message, where the first notification message is used to instruct the first communications apparatus to stop sending the first data frame.

According to a seventh aspect, this application provides a communications apparatus, including: a second receiving module, configured to receive a first data frame sent by a kernel of an AP while the kernel sends a second data frame to a second communications apparatus of the AP, where the first data frame and the second data frame are a same data frame; a fifth transceiver module, configured to send the first data frame to a third communications apparatus of a STA through a first channel; a sixth transceiver module, configured to receive a first notification message sent by the second communications apparatus, where the first notification message indicates that the second communications apparatus successfully sends the second data frame to a fourth communications apparatus of the STA through a second channel; and a third control module, configured to stop, in response to the first notification message, sending the first data frame.

According to the seventh aspect, in some possible implementations, the third control module is configured to delete, in response to the first notification message, the first data frame in a sending queue corresponding to the first communications apparatus; or the third control module is configured to stop, in response to the first notification message, the first data frame from being retransmitted on the second channel.

According to the seventh aspect, in some possible implementations, the fifth transceiver module is further configured to: after sending the first data frame to the third communications apparatus through the first channel, receive a second acknowledgment message from the third communications apparatus through the first channel, where the second acknowledgment message indicates that the third communications apparatus receives the first data frame through the first channel; and the sixth transceiver module is configured to send a second notification message to the second communications apparatus in response to the second acknowledgment message, where the second notification message is used to instruct the second communications apparatus to stop sending the second data frame.

According to the seventh aspect, in some possible implementations, the second receiving module is further configured to add a first identifier to the first data frame, where the first identifier uniquely identifies the first data frame, and the first identifier of the first data frame is the same as a second identifier of the second data frame.

According to an eighth aspect, this application provides a communications apparatus, including: a seventh transceiver module, configured to: after receiving a second data frame from a second communications apparatus in an AP through a second channel, send a first acknowledgment message to the second communications apparatus through the second channel; and a sending module, configured to forward the received second data frame to a kernel of a STA.

According to the eighth aspect, in some possible implementations, the apparatus further includes: an eighth transceiver module, configured to send a third notification message to a third communications apparatus after the seventh transceiver module receives the second data frame from the second communications apparatus through the second channel, where the third notification message is used to instruct the third communications apparatus to discard a first data frame received through the first channel.

According to the eighth aspect, in some possible implementations, the apparatus further includes an eighth transceiver module and a fourth control module, where the eighth transceiver module is configured to receive a fourth notification message from a third communications apparatus, where the fourth notification message indicates that the third communications apparatus has received a first data frame; and the fourth control module is configured to control, in response to the fourth notification message, the seventh transceiver module to discard the second data frame when receiving the second data frame.

According to the eighth aspect, in some possible implementations, the sending module is further configured to: delete a second identifier of the second data frame; and forward the second data frame obtained after the deletion to the kernel.

According to a ninth aspect, this application provides an AP, including a first network adapter and a second network adapter. The first network adapter is configured to perform the data transmission method according to any one of the first aspect; and the second network adapter is configured to perform the data transmission method according to any one of the second aspect.

According to a tenth aspect, this application provides a STA, including a third network adapter and a fourth network adapter. The third network adapter and the fourth network adapter are configured to perform the data transmission method according to any one of the third aspect.

According to an eleventh aspect, this application provides a computer readable storage medium. The computer readable storage medium stores an instruction, and when the instruction is run on a computer, the instruction is used to perform the data transmission method according to any one of the first aspect to the fourth aspect.

According to a twelfth aspect, this application provides a computer program or a computer program product. When the computer program or the computer program product is executed on a computer, the computer is enabled to implement the data transmission method according to any one of the first aspect to the fourth aspect.

According to a thirteenth aspect, this application provides a communications system, including the AP according to any one of the first aspect and the second aspect and the STA according to any one of the third aspect.

DETAILED DESCRIPTIONS

The following describes the embodiments of this application with reference to the accompanying drawings in the embodiments of this application. In the following description, specific aspects of the embodiments of this application are shown by reference to a part of this application and in a manner of description, or the accompanying drawings of specific aspects of the embodiments of this application may be used. It should be understood that the embodiments of this application may be used in other aspects, and may include structural or logical changes not depicted in the accompanying drawings. Therefore, the following detailed description should not be understood in a restrictive sense, and the scope of this application is defined by the appended claims. For example, it should be understood that the disclosure in connection with the described method may be equally applicable to a corresponding device or system configured to perform the method, and vice versa. For example, if one or more specific method steps are described, a corresponding device may include one or more units, such as a functional unit, to perform the described one or more method steps (for example, with one unit performing one or more steps, or with a plurality of units, each of which performs one or more of a plurality of steps), even if such one or more units are not explicitly described or illustrated in the accompanying drawings. In addition, for example, if a specific apparatus is described based on one or more units, such as a functional unit, a corresponding method may include one step to perform the functionality of one or more units (for example, with one step performing the functionality of one or more units, or with a plurality of steps, each of which performs the functionality of one or more of a plurality of units), even if such one or more steps are not explicitly described or illustrated in the accompanying drawings. Further, it should be understood that the features of examples of embodiments and/or aspects described herein may be combined with each other unless explicitly stated otherwise.

Figure 1:
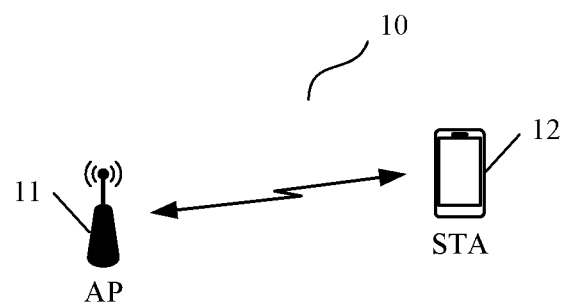
FIG. 1 is a schematic architectural diagram 1 of a communications system according to an embodiment of this application.

An embodiment of this application provides a communications system. The communications system may be a Wi-Fi communications system, or may be applied to a communications system integrating Wi-Fi and a wireless mobile communications network, for example, a 4G network or a 5G network. FIG. 1 is a schematic architectural diagram 1 of a communications system 10 according to an embodiment of this application. As shown in FIG. 1, the communications system 10 may include an AP 11 and a STA 12. The AP may communicate with a STA in a coverage area of the AP through an air interface.

In actual application, the AP may be an AP in a wireless local area network (WLAN), or may be an AP in a Long Term Evolution (LTE) system or a new radio (NR) system. The STA may be a cellular phone or a personal digital assistant (PDA), a wireless modem, a handheld device, a laptop computer, a cordless phone, a wireless local loop (WLL), a tablet computer (pad), or the like. With development of wireless communications technologies, all devices that can access a wireless communications system, can communicate with a network side of the wireless communications system, or communicate with another device through the wireless communications system may be a STA in some embodiments of this application. For example, terminals and cars in intelligent transportation, household devices in smart households, electric meter reading instruments, voltage monitoring instruments, environment monitoring instruments in smart grids, video monitoring instruments in smart security networks, and cash registers. The STA can be statically fixed or mobile.

Certainly, in embodiments of this application, a type and a quantity of network elements included in the communications system, and a connection relationship between network elements are not limited thereto.

Figure 2:
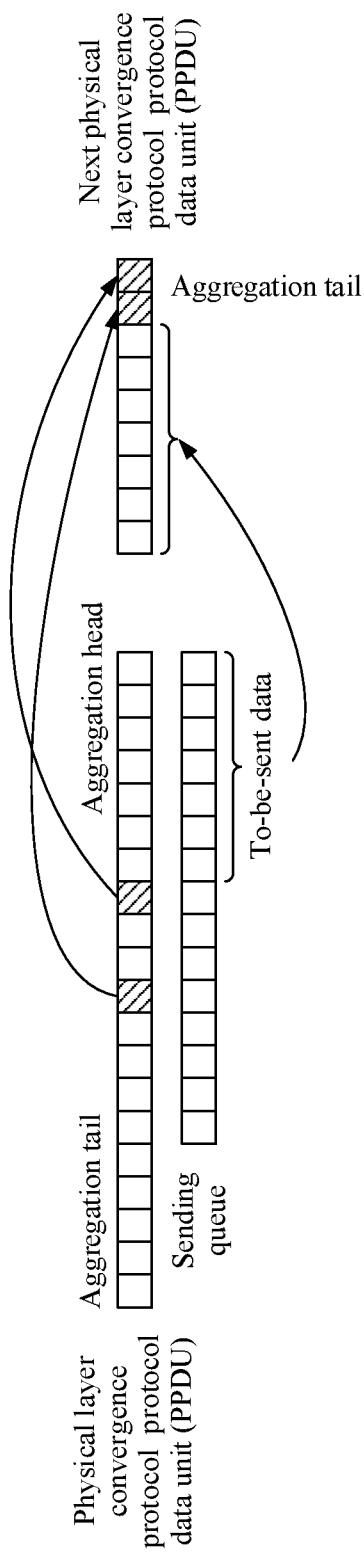
FIG. 2 is a schematic diagram 1 of data frame retransmission according to an embodiment of this application.
Figure 3:
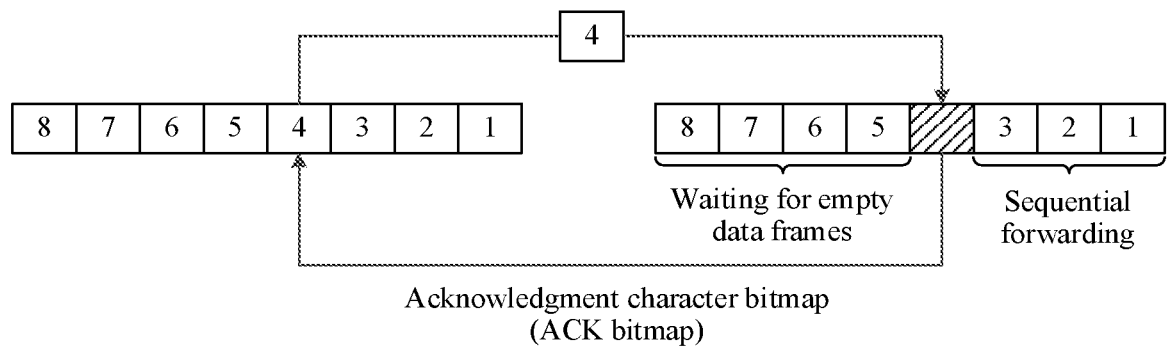
FIG. 3 is a schematic diagram 2 of data frame retransmission according to an embodiment of this application.

FIG. 2 is a schematic diagram of data frame retransmission according to an embodiment of this application. As shown in FIG. 2, after an AP sends a physical layer convergence protocol (PLCP) data unit (PPDU), a STA returns an acknowledgment (ACK) to the AP, where the ACK includes a bitmap of data frames that are successfully sent. The bitmap may indicate which data frames are successfully received and which data frames are not received in an aggregation. The AP may place, in a header of a next PPDU, the data frames that fail to be sent, aggregate the data frames, and re-send the data frames. Usually, a sending device allows a plurality of retransmissions, when a quantity of retransmissions reaches an upper limit, data frames that fail to be sent are discarded. After a data frame is discarded, the AP obtains the data frame again and sends the data frame again. For example, FIG. 3 is a schematic diagram 2 of data frame retransmission according to an embodiment of this application. As shown in FIG. 3, when an ACK bitmap indicates that a STA fails to receive a data frame 4, the AP adds the data frame 4 to the next PPDU for retransmission. In this case, data frames following the data frame 4 that are received by the STA, for example, a data frame 5 to a data frame 8 need to wait for an empty data frame to be supplemented. To be specific, waiting is performed for an empty data frame, namely, the data frame 4, to be supplemented. The STA forwards sequential data frames to a kernel only after the empty data frame is supplemented. In this way, a relatively large latency is generated, relatively severe service interference is caused, and video games experience frame freezing and a frame loss, causing deteriorated user experience.

To resolve the foregoing problem, an embodiment of this application provides a data transmission method. The method may be applied to the foregoing communications system.

Figure 4:
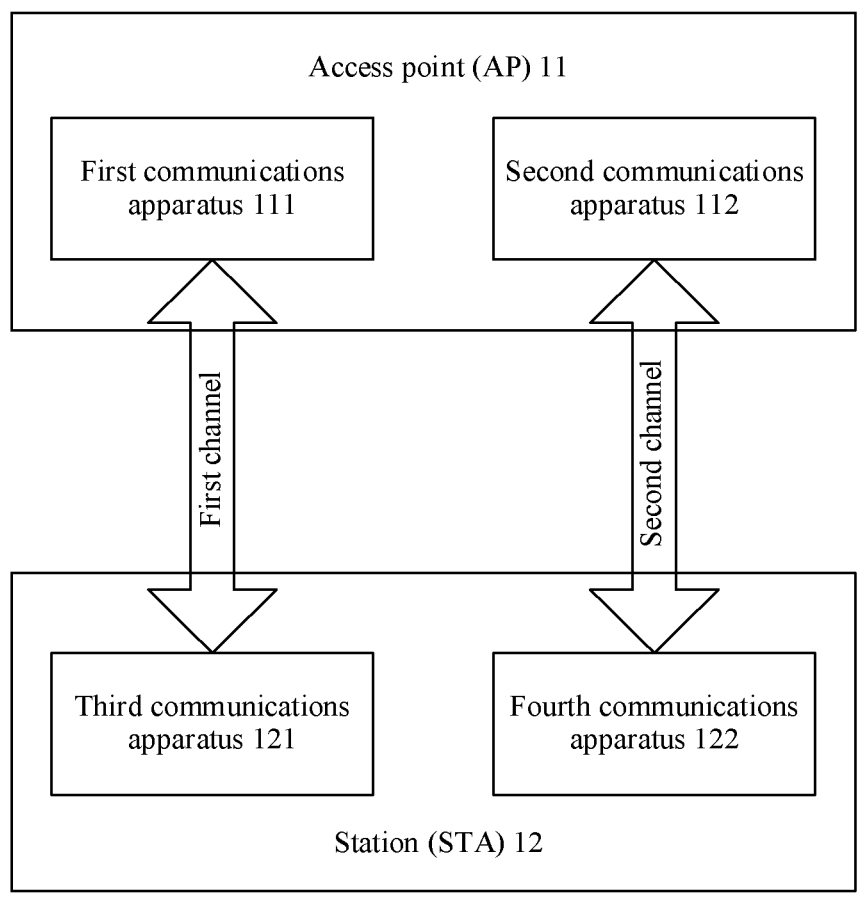
FIG. 4 is a schematic architectural diagram 2 of a communications system according to an embodiment of this application.

In an embodiment of this application, FIG. 4 is a schematic architectural diagram 2 of a communications system according to an embodiment of this application. It can be learned with reference to FIG. 1 and FIG. 4, the AP 11 may include a kernel (not shown in the figure), a first communications apparatus 111, and a second communications apparatus 112. Correspondingly, the STA 12 may include a kernel (not shown in the figure), a third communications apparatus 121, and a fourth communications apparatus 122. A first channel is established between the first communications apparatus 111 and the third communications apparatus 121, and the first communications apparatus 111 and the third communications apparatus 121 may communicate through the first channel. A second channel is established between the second communications apparatus 112 and the fourth communications apparatus 122, and the second communications apparatus 112 and the fourth communications apparatus 122 may communicate through the second channel. To avoid overlapping between the two channels and avoid mutual interference between the channels, the first channel and the second channel may be channels in different frequency bands. For example, the first channel may be a channel in a 2.4 GHz frequency band, and the second channel may be a channel in a 5 GHz frequency band, or the first channel may be a channel in a 5 GHz frequency band, and the second channel may be a channel in a 2.4 GHz frequency band. Certainly, the first channel and the second channel are not limited to being in the foregoing two frequency bands. A person skilled in the art may make design according to an actual requirement. This is not specifically limited in the embodiments of this application.

In actual application, the first communications apparatus and the second communications apparatus may be two wireless network adapters disposed in the AP, and the first communications apparatus and the second communications apparatus may be physically separated, or may be physically integrated. The third communications apparatus and the fourth communications apparatus may be two network interface cards disposed in the STA, and the third communications apparatus and the fourth communications apparatus may be physically separated, or may be physically integrated.

It should be noted that when the communications system is a Wi-Fi communications system, the foregoing communications apparatuses may be Wi-Fi network adapters, and both the first channel and the second channel may be Wi-Fi channels. When the communications system is a system that integrates Wi-Fi and a wireless mobile network, one communications apparatus in the AP may be a Wi-Fi network adapter, and the other communications apparatus may be an LTE network adapter or an NR network adapter. In this case, one of the first channel and the second channel is a Wi-Fi channel, and the other channel is an LTE or NR channel. Certainly, the foregoing communications apparatuses and may be network adapters of other communications protocols, and the first channel and the second channel are not limited to the foregoing several cases. This is not specifically limited in this embodiment of this application.

The following describes in detail the data transmission method provided in the embodiments of this application with reference to the communications system shown in FIG. 4.

Figure 5:
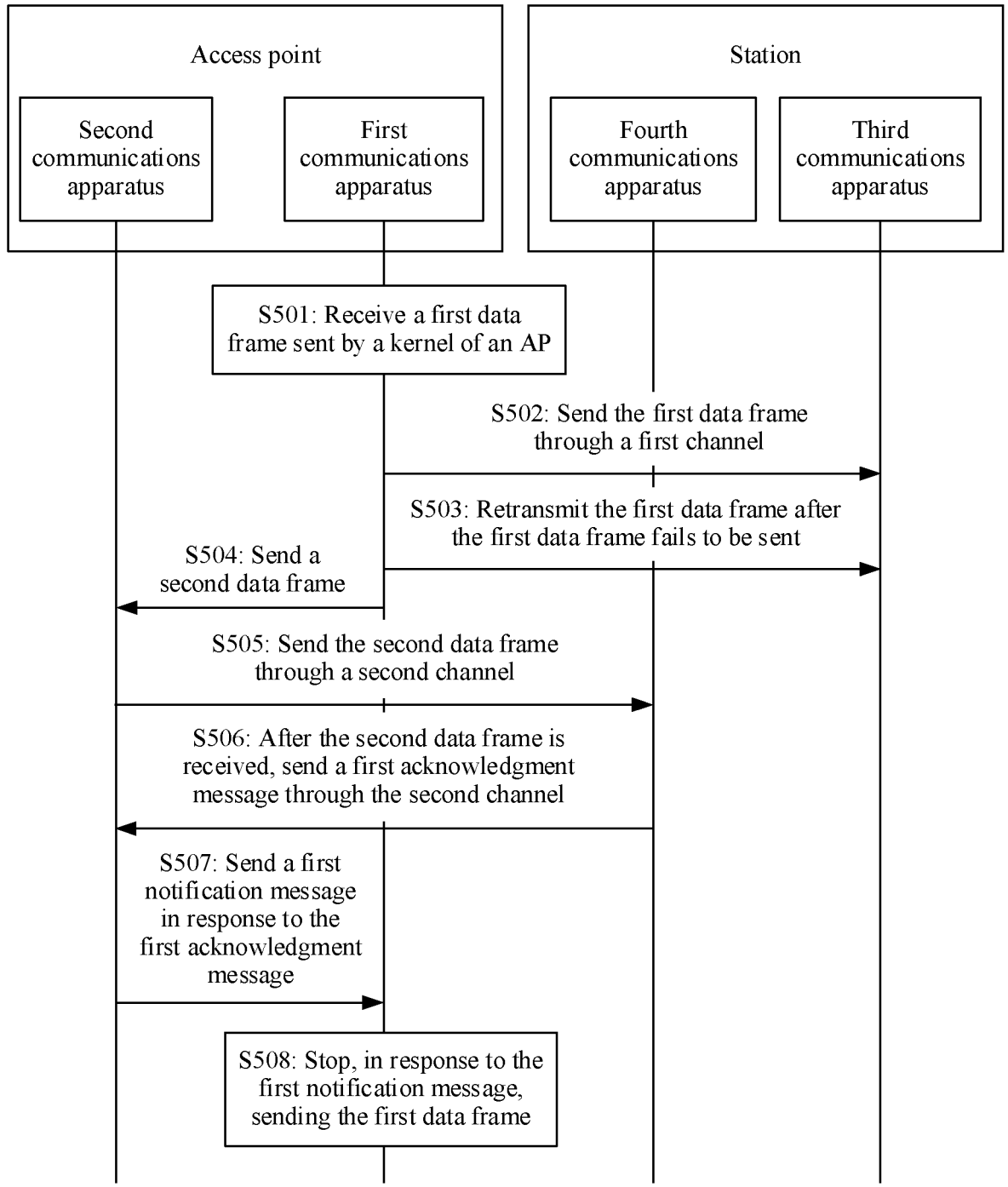
FIG. 5 is a schematic flowchart 1 of implementation of a data transmission method according to an embodiment of this application.

FIG. 5 is a schematic flowchart 1 of implementation of a data transmission method according to an embodiment of this application. As shown in FIG. 5, the data transmission method may include the following steps.

S501: A first communications apparatus receives a first data frame sent by a kernel of an AP.

S502: The first communications apparatus sends the first data frame to a third communications apparatus through a first channel.

Herein, in a process in which the AP sends data to the STA, the kernel of the AP sends the to-be-sent first data frame to the first communications apparatus, and a medium access control (MAC) layer of the first communications apparatus sends the first data frame to the third communications apparatus through a physical layer (PHY) by using the first channel.

S503: After the first data frame fails to be sent, the first communications apparatus retransmits the first data frame.

S504: The first communications apparatus sends a second data frame to a second communications apparatus.

The first data frame and the second data frame are a same data frame.

Herein, after the MAC layer of the first communications apparatus sends the first data frame to the third communications apparatus, if a MAC layer of the third communications apparatus receives the first data frame through the PHY layer of the third communications apparatus, the MAC layer feeds back acknowledgment message, namely, an ACK frame, to the MAC layer of the first communications apparatus through the first channel, when the MAC layer of the first communications apparatus receives the acknowledgment message, it indicates that the first data frame is successfully sent. Otherwise, if the current first channel is severely interfered, and as a result, the third communications apparatus does not receive the first data frame, the MAC layer of the third communications apparatus does not feedback acknowledgment message to the MAC layer of the first communications apparatus. In this case, if the MAC layer of the first communications apparatus does not receive the acknowledgment message within a preset time period, it indicates that the first data frame fails to be sent, in this case, the MAC layer of the first communications apparatus may duplicate the first data frame to obtain the second data frame, and then the second data frame is sent to a MAC layer of the second communications apparatus through an internal interface.

In actual application, in addition to the ACK frame, the acknowledgment message sent by the STA to the AP may be higher layer signaling. This is not specifically limited in this embodiment of this application. Certainly, in the following embodiment, the acknowledgment message sent by the STA to the AP may also be of a same case. This is not specifically limited in this embodiment of this application.

It should be noted that the step of retransmitting the first data frame in S503 and the step of sending the second data frame to the second communications apparatus in S504 may be performed simultaneously, or S503 may be performed before S504, or S504 may be performed before S503. This is not specifically limited in this embodiment of this application.

S505: The second communications apparatus sends the second data frame to a fourth communications apparatus through a second channel.

Herein, in S504, the MAC layer of the second communications apparatus obtains, through an internal interface, the second data frame sent by the MAC layer of the first communications apparatus. After S504, the MAC layer of the first communications apparatus may retransmit the second data frame to the third communications apparatus through the first channel. In this process, the MAC layer of the second communications apparatus may send the second data frame to the fourth communications apparatus through the second channel. In this way, the same data frame is simultaneously sent through the first channel and the second channel. In this case, when the first channel is blocked, the STA may further receive data through the second channel, thereby enhancing an anti-interference capability of data transmission, reducing a latency and packet loss, and improving reliability and real-time performance of data transmission on a wireless link.

S506: After receiving the second data frame, the fourth communications apparatus sends a first acknowledgment message (for example, an ACK frame) to the second communications apparatus through the second channel.

When S506 is performed, the fourth communications apparatus forwards the received second data frame to a kernel of the STA.

Herein, after the AP sends the first data frame and the second data frame to the STA in S505, interference may not exist on the second channel or the interference is relatively small, so that the fourth communications apparatus can receive the second data frame sent by the second communications apparatus. In this case, a MAC layer of the fourth communications apparatus returns a first acknowledgment message, namely, an ACK frame, to the second communications apparatus, and the MAC layer of the fourth communications apparatus forwards the second data frame to the kernel of the STA.

S507: The second communications apparatus sends a first notification message to the first communications apparatus in response to the first acknowledgment message.

Herein, after the MAC layer of the fourth communications apparatus feeds back the first acknowledgment message to the MAC layer of the second communications apparatus in S506, the MAC layer of the second communications apparatus receives the first acknowledgment message through the second channel, and therefore it is learned that the fourth communications apparatus has received the second data frame. In this case, to avoid data redundancy caused by data retransmission, the MAC layer of the second communications apparatus generates the first notification message in response to the first acknowledgment message, and sends the first notification message to the MAC layer of the first communications apparatus through the internal interface, to notify the first communications apparatus that the second data frame has been successfully sent through the second channel.

S508: The first communications apparatus stops, in response to the first notification message, sending the first data frame.

Herein, after learning, by using the first notification message, that the second data frame has been successfully sent through the second channel, the MAC layer of the first communications apparatus stops sending the first data frame, in other words, stops sending the first data frame or prevents the first data frame from being retransmitted, so as to prevent the STA from receiving the first data frame that repeats the second data frame.

In a specific implementation process, S508 may include: The first communications apparatus deletes, in response to the first notification message, the first data frame in a sending queue corresponding to the first communications apparatus, or the first communications apparatus stops, in response to the first notification message, retransmission of the first data frame on the second channel.

Specifically, after receiving the first notification message, the MAC layer of the first communications apparatus searches the sending queue for the first data frame in response to the first notification message, and if the first data frame is in the sending queue, deletes the first data frame from the sending queue. In this way, the first data frame stops being sent to the third communications apparatus, and instead, a following data frame continues to be sent to reduce a latency. Alternatively, after receiving the first notification message, the MAC layer of the first communications apparatus may respond to the first notification message, after the first data frame fails to be retransmitted in S503, forbid the first data frame to be retransmitted, and continue to send a following data frame to reduce a latency. Certainly, after receiving the first notification message, the MAC layer of the first communications apparatus may further respond to the first notification message, and first search the sending queue for the first data frame; and if the first data frame is in the sending queue, delete the first data frame from the sending queue; or if the first data frame is not in the sending queue, it indicates that the first data frame enters a PHY layer of the first communications apparatus and is about to be retransmitted or the first data frame has been retransmitted through the first channel. In this case, the MAC layer of the first communications apparatus may forbid, after the first data frame fails to be retransmitted in S503 this time, the first data frame to be retransmitted.

In actual application, the sending queue of the first communications apparatus may include a software sending queue and a hardware sending queue. The sending queue may be a software sending queue, or may be a hardware sending queue. After the first data frame enters the software sending queue, the MAC layer of the first communications apparatus may delete the first data frame from the software sending queue. After the first data frame enters the hardware sending queue, the MAC layer of the first communications apparatus may also delete the first data frame from the hardware queue, or may not delete the first data frame from the hardware queue, but no longer retransmits the first data frame after the first data frame fails to be retransmitted this time. This is not specifically limited in this embodiment of this application.

Figure 6:
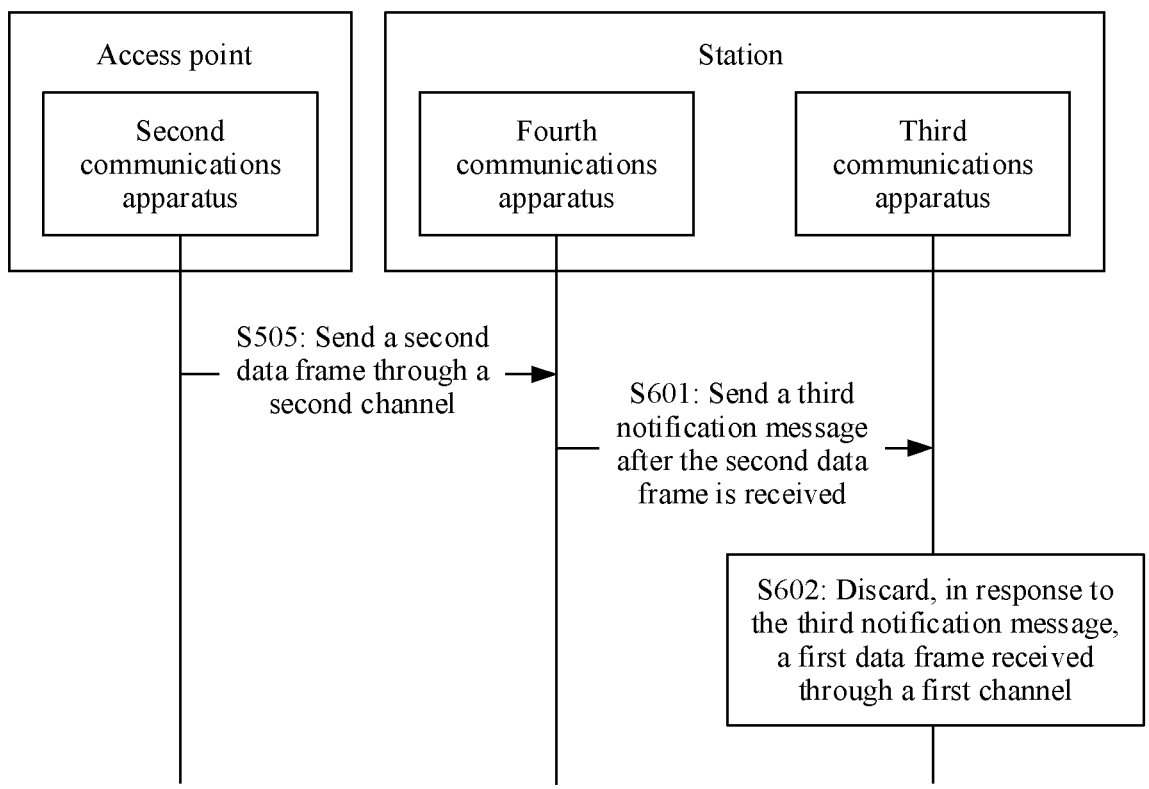
FIG. 6 is a schematic flowchart of implementation of performing, by a STA, deduplication on data frames according to an embodiment of this application.

In an embodiment of this application, FIG. 6 is a schematic flowchart of implementation of performing, by a STA, deduplication on data frames according to an embodiment of this application. As shown in FIG. 6, after S505, the foregoing method may further include the following steps:

S601: After receiving the second data frame, the fourth communications apparatus sends a third notification message to the third communications apparatus.

S602: The third communications apparatus discards, in response to the third notification message, the first data frame received through the first channel.

Herein, after receiving the second data frame in S505, the fourth communications apparatus may further send the third notification message to the third communications apparatus in addition to performing S506 of feeding back the first acknowledgment message to the second communications apparatus and forwarding the second data frame to the kernel of the STA, so that when the third communications apparatus subsequently receives the first data frame sent by the first communications apparatus, the first data frame is discarded, so as to avoid repeated receiving of a same data frame, thereby implementing data frame deduplication.

In this way, a process in which the AP sends the same data frame to the STA through the two channels between the AP and the STA is implemented.

In an embodiment of this application, after S501 and before S502, the method may further include: The first communications apparatus adds a first identifier to the first data frame. The first identifier can uniquely indicate the first data frame. For example, an identifier field is added to the first data frame between the MAC layer and the PHY layer, and the first identifier is written into the identifier field of the first data frame. In actual application, the first identifier may be a sequence number of the first data frame.

In the foregoing embodiment, because the second data frame is obtained by the first communications apparatus by duplicating the first data frame, an identifier field is also available to the second data frame between the MAC layer and the PHY layer, and a second identifier is written into the identifier field. In this case, the second identifier uniquely identifies the second data frame, and the second identifier is the same as the first identifier, and may be a sequence number of the second data frame, namely, the sequence number of the first data frame.

Correspondingly, in the foregoing embodiment, the first data frame sent or retransmitted by the first communications apparatus to the third communications apparatus is a first data frame to which the first identifier is added, and the second data frame sent by the second communications apparatus to the fourth communications apparatus is also a second data frame to which the second identifier is added.

Further, the step that the fourth communications apparatus forwards the received second data frame to a kernel of the STA in S506 may include: The fourth communications apparatus deletes the second identifier of the second data frame; and the third communications apparatus forwards the second data frame obtained after the deletion to the kernel of the STA. In other words, the fourth communications apparatus deletes the identifier field in the second data frame together with the second identify, and then forwards the second data frame to the kernel of the STA.

In some possible implementations, S503 and S504 may alternatively be performed when the first data frame fails to be retransmitted a plurality of times, or may be performed when the first data frame fails to be sent once. This is not specifically limited in this embodiment of this application. If S503 and S504 are performed when the first data frame fails to be sent once, a same data frame is sent simultaneously by using the two channels as long as the first data frame fails to be sent, so as to reduce a latency caused by a plurality of retransmissions, and reduce a packet loss.

In this application, the AP sends the same data frame to the STA through the two channels between the AP and the STA. In this case, when one channel is blocked, the STA can still receive data through the other channel. In this way, an anti-interference capability of transmission is enhanced, a latency and a packet loss are reduced, and then reliability and real-time performance of data transmission on a wireless link are improved.

Figure 7:
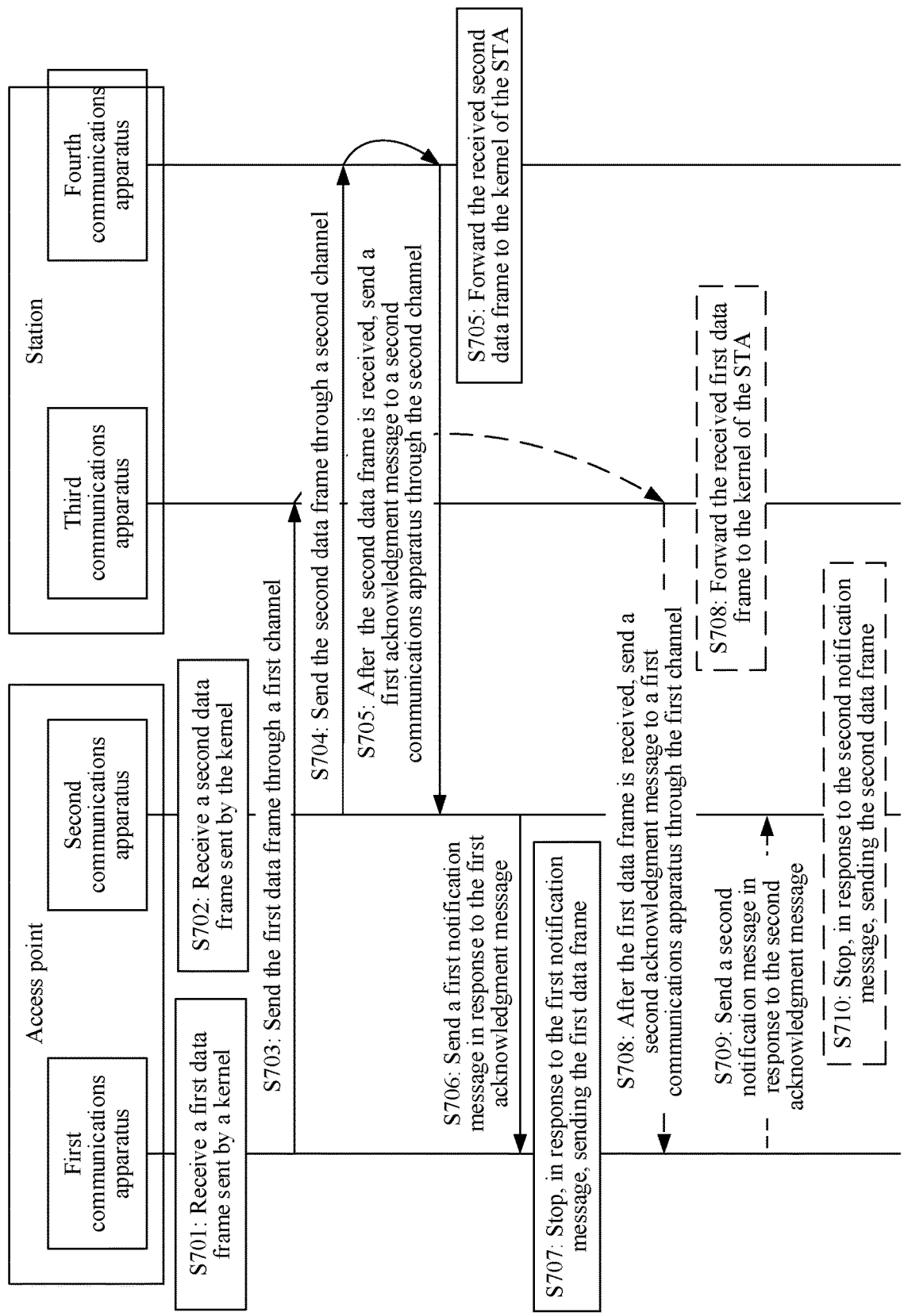
FIG. 7 is a schematic flowchart 2 of implementation of a data transmission method according to an embodiment of this application.

In another embodiment of this application, FIG. 7 is a schematic flowchart 2 of implementation of a data transmission method according to an embodiment of this application. As shown by solid lines in FIG. 7, the data transmission method may include the following steps.

S701: A first communications apparatus receives a first data frame sent by a kernel of an AP.

S702: A second communications apparatus receives a second data frame sent by the kernel of the AP.

The first data frame in S701 and the second data frame in S702 are a same data frame.

Herein, the kernel of the AP duplicates the first data frame sent to the first communications apparatus to obtain the second data frame, simultaneously sends the first data frame to a MAC layer of the first communications apparatus, and sends the second data frame to a MAC layer of the second communications apparatus. To implement data frame alignment, play a role of two channels between the AP and a STA, and ensure that a same data frame is simultaneously sent on the two channels for each sending opportunity, the kernel sends the first data frame and the second data frame at the same time to the greatest extent.

S703: The first communications apparatus sends the first data frame to a third communications apparatus through a first channel.

S704: The second communications apparatus sends the second data frame to a fourth communications apparatus through a second channel.

It should be noted that S702 and S703 need to be performed simultaneously. To be specific, in a process in which the first communications apparatus sends the first data frame to the third communications apparatus through the first channel, the second communications apparatus sends the second data frame to the fourth communications apparatus through the second channel. In this way, the same data frame is simultaneously sent through the first channel and the second channel. In this case, when the first channel is blocked, the STA may further receive data through the second channel, thereby enhancing an anti-interference capability of data transmission, reducing a latency and a packet loss, and then improving reliability and real-time performance of data transmission on a wireless link.

Next, in actual application, in S703 and S704, the first data frame and the second data frame are simultaneously sent through the two channels between the AP and the STA. In this case, the third communications apparatus or the fourth communications apparatus can receive corresponding data frames. Certainly, if communication quality of each of the first channel and the second channel is good, both the third communications apparatus and the fourth communications apparatus may also receive corresponding data frames.

In this case, after S703, S705 is performed: After receiving the second data frame, the fourth communications apparatus sends a first acknowledgment message (for example, a first ACK frame) to the second communications apparatus through the second channel, and forwards the received second data frame to a kernel of the STA.

S706: The second communications apparatus sends a first notification message to the first communications apparatus in response to the first acknowledgment message.

S707: The first communications apparatus stops, in response to the first notification message, sending the first data frame.

An execution process of S705 to S707 is the same as that of S507 and S508 in the foregoing embodiment, and details are not described herein again.

Correspondingly, as shown by dashed lines in FIG. 7, after S704, S708 may be further performed: After receiving the first data frame, the third communications apparatus sends a second acknowledgment message (for example, a second ACK frame) to the first communications apparatus through the first channel, and forwards the received first data frame to the kernel of the STA.

S709: The first communications apparatus sends a second notification message to the second communications apparatus in response to the second acknowledgment message.

S710: The second communications apparatus stops, in response to the second notification message, sending the second data frame.

An execution process of S708 to S710 is similar to a process of performing S705 to S707 by the third communications apparatus, and details are not described herein again.

In some possible implementation processes, after the fourth communications apparatus receives the second data frame in S701 to S707, to avoid repeatedly receiving a same data frame and implement data frame deduplication, the fourth communications apparatus may perform S601 of sending the third notification message to the third communications apparatus after receiving the second data frame, and then, the third communications apparatus may perform S602 of discarding, in response to the third notification message, the first data frame received through the first channel.

Correspondingly, after the third communications apparatus receives the first data frame in S708 to S710, to avoid repeatedly receiving a same data frame and implement data frame deduplication, the third communications apparatus may also send a fourth notification message to the fourth communications apparatus after receiving the first data frame, and then the fourth communications apparatus discards, in response to the fourth notification message, the second data frame received through the second channel.

In some possible implementation processes, data frames may be further deduplicated on a common interface between the kernel of the STA and each of the third communications apparatus and the fourth communications apparatus. In this case, after receiving the first data frame, the third communications apparatus forwards the first data frame to the kernel of the STA. After receiving the second data frame, the fourth communications apparatus forwards the second data frame to the kernel of the STA. Then, on the common interface, according to a first-come first-forward principle, a data frame first forwarded by the third communications apparatus or the fourth communications apparatus to the kernel of the STA is forwarded, and a data frame later forwarded by the third communications apparatus or the fourth communications apparatus to the kernel of the STA is discarded. For example, the common interface first receives the first data frame sent by the third communications apparatus, and forwards the first data frame to the kernel of the STA, and then the common interface receives the second data frame sent by the fourth communications apparatus. In this case, the common interface discards the second data frame.

In this way, a process in which the AP sends the same data frame to the STA through the two channels between the AP and the STA is implemented.

It should be noted that in the foregoing embodiment, after S701 and before S703, the foregoing method may further include: The first communications apparatus adds a first identifier to the first data frame. The first identifier can uniquely indicate the first data frame. Similarly, after S702 and before S704, the method may further include: The second communications apparatus adds a second identifier to the second data frame. The second identifier can uniquely indicate the second data frame. In an embodiment of this application, the first identifier may be a sequence number of the first data frame, and the second identifier may be a sequence number of the second data frame. The first identifier and the second identifier are the same, to be specific, the sequence number of the first data frame is the same as the sequence number of the second data frame.

Herein, a process of adding an identifier to each of the first data frame and the second data frame is the same as a process of adding the second identifier to the second data frame by the first communications apparatus in the foregoing embodiment, and details are not described herein again.

Correspondingly, in S703 in the foregoing embodiment, the first data frame sent by the first communications apparatus to the third communications apparatus is the first data frame to which the first identifier is added. In S704 in the foregoing embodiment, the second data frame sent by the second communications apparatus to the fourth communications apparatus is the second data frame to which the second identifier is added.

Further, the step that the fourth communications apparatus forwards the received second data frame to a kernel of the STA in S705 may include: The fourth communications apparatus deletes the second identifier of the second data frame, and the fourth communications apparatus forwards the second data frame obtained after the deletion to the kernel of the STA. In other words, the fourth communications apparatus deletes the identifier field in the second data frame together with the second identify, and then forwards the second data frame to the kernel of the STA. Similarly, the step that the third communications apparatus forwards the received first data frame to the kernel of the STA in S708 may include: The third communications apparatus deletes the first identifier of the first data frame, and the third communications apparatus forwards the first data frame obtained after the deletion to the kernel of the STA. In other words, the third communications apparatus deletes the identifier field in the first data frame together with the first identify, and then forwards the first data frame to the kernel of the STA.

Further, in the foregoing data frame deduplication process, the third communications apparatus, the fourth communications apparatus, or the common interface may all determine, based on an identifier, whether a same data frame is received, and then perform deduplication on data frames.

In this application, the AP sends the same data frame to the STA through the two channels between the AP and the STA. In this case, when one channel is blocked, the STA can still receive data through the other channel. In this way, an anti-interference capability of transmission is enhanced, a latency and a packet loss are reduced, and then reliability and real-time performance of data transmission on a wireless link are improved.

Based on a same inventive concept as that of the foregoing method, an embodiment of this application provides a communications apparatus. The communications apparatus may be consistent with the first communications apparatus in the foregoing embodiments.

Figure 8:
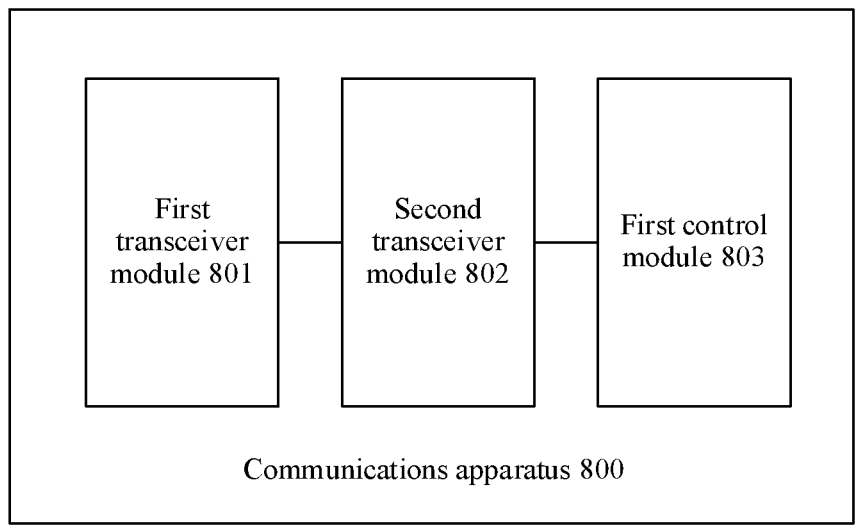
FIG. 8 is a schematic structural diagram 1 of a communications apparatus according to an embodiment of this application.

FIG. 8 is a schematic structural diagram 1 of a communications apparatus according to an embodiment of this application. Referring to FIG. 8, the communications apparatus 800 may include: a first transceiver module 801, configured to retransmit a first data frame after failing to send the first data frame to a third communications apparatus of a STA through a first channel; a second transceiver module 802, configured to send a second data frame to a second communications apparatus of an AP, where the first data frame and the second data frame are a same data frame; and further configured to receive a first notification message sent by the second communications apparatus, where the first notification message indicates that the second communications apparatus successfully sends the second data frame to a fourth communications apparatus of the STA through a second channel, and the first channel and the second channel are channels in different frequency bands; and a first control module 803, configured to stop, in response to the first notification message, sending the first data frame.

In some possible implementations, the first control module is configured to delete, in response to the first notification message, the first data frame in a sending queue corresponding to the communications apparatus; or the first control module is configured to prevent, in response to the first notification message, the first data frame from being retransmitted on the second channel.

In some possible implementations, the communications apparatus further includes: a first receiving module, configured to: receive the first data frame sent by a kernel of the AP, and add a first identifier to the first data frame, where the first identifier uniquely identifies the first data frame, and the first identifier of the first data frame is the same as a second identifier of the second data frame.

It should be further noted that for specific implementation processes of the first transceiver module, the second transceiver module, the first control module, and the first receiving module, refer to detailed descriptions in the embodiments in FIG. 5 and FIG. 6. For brevity of the specification, details are not described herein again.

The first transceiver module and the second transceiver module mentioned in some embodiments of this application may be a transceiver interface, a transceiver circuit, a transceiver, or the like. The first receiving module may be a receiving interface, a receiving circuit, a receiver, or the like. The first control module may be one or more processors.

Based on a same inventive concept as that of the foregoing embodiments, an embodiment of this application provides a communications apparatus. The communications apparatus may be consistent with the second communications apparatus in the foregoing embodiments.

Figure 9:
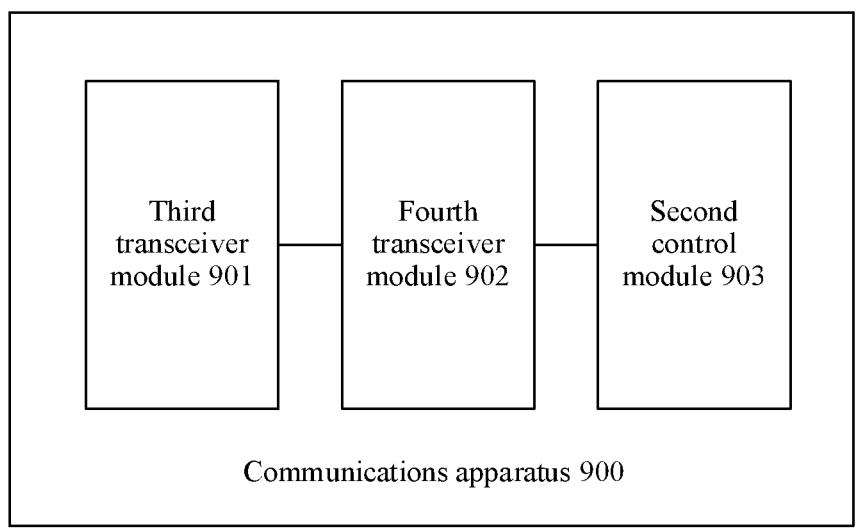
FIG. 9 is a schematic structural diagram 2 of a communications apparatus according to an embodiment of this application.

FIG. 9 is a schematic structural diagram 2 of a communications apparatus according to an embodiment of this application. Referring to FIG. 9, the communications apparatus 900 may include a third transceiver module 901, configured to receive a second data frame, where the second data frame is sent by a first communications apparatus of an AP when the first communications apparatus retransmits a first data frame to a third communications apparatus of a STA through a first channel, and the first data frame and the second data frame are a same data frame; a fourth transceiver module 902, configured to send the second data frame to a fourth communications apparatus of the STA through a second channel; and further configured to receive a first acknowledgment message from the fourth communications apparatus through the second channel, where the first acknowledgment message indicates that the fourth communications apparatus receives the second data frame through the second channel, and the first channel and the second channel are channels in different frequency bands; and a second control module 903, configured to send a first notification message to the first communications apparatus in response to the first acknowledgment message, where the first notification message is used to instruct the first communications apparatus to stop sending the first data frame.

It should be further noted that for specific implementation processes of the third transceiver module, the fourth transceiver module, and the second control module, refer to detailed descriptions in the embodiments in FIG. 5 and FIG. 6. For brevity of the specification, details are not described herein again.

The third transceiver module and the fourth transceiver module mentioned in some embodiments of this application may be a transceiver interface, a transceiver circuit, a transceiver, or the like. The second control module may be one or more processors.

Based on a same inventive concept as that of the foregoing embodiments, an embodiment of this application provides a communications apparatus. The communications apparatus may be consistent with the first communications apparatus in the foregoing embodiments.

Figure 10:
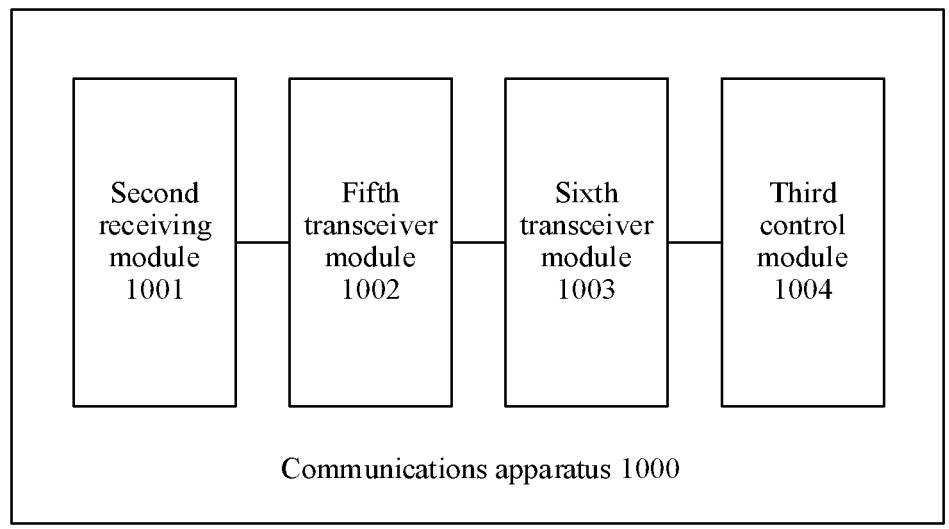
FIG. 10 is a schematic structural diagram 3 of a communications apparatus according to an embodiment of this application.

FIG. 10 is a schematic structural diagram 3 of a communications apparatus according to an embodiment of this application. Referring to FIG. 10, the communications apparatus 1000 may include: a second receiving module 1001, configured to receive a first data frame sent by a kernel of an AP while the kernel sends a second data frame to a second communications apparatus of the AP, where the first data frame and the second data frame are a same data frame; a fifth transceiver module 1002, configured to send the first data frame to a third communications apparatus of a STA through a first channel; a sixth transceiver module 1003, configured to receive a first notification message sent by the second communications apparatus, where the first notification message indicates that the second communications apparatus successfully sends the second data frame to a fourth communications apparatus of the STA through a second channel; and a third control module 1004, configured to stop, in response to the first notification message, sending the first data frame.

In some possible implementations, the third control module is configured to delete, in response to the first notification message, the first data frame in a sending queue corresponding to the communications apparatus; or the third control module is configured to prevent, in response to the first notification message, the first data frame from being retransmitted on the second channel.

In some possible implementations, the fifth transceiver module is further configured to: after sending the first data frame to the third communications apparatus through the first channel, receive a second acknowledgment message from the third communications apparatus through the first channel, where the second acknowledgment message indicates that the third communications apparatus receives the first data frame through the first channel; and the sixth transceiver module is configured to send a second notification message to the second communications apparatus in response to the second acknowledgment message, where the second notification message is used to instruct the second communications apparatus to stop sending the second data frame.

In some possible implementations, the second receiving module is further configured to add a first identifier to the first data frame, where the first identifier uniquely identifies the first data frame, and the first identifier of the first data frame is the same as a second identifier of the second data frame.

It should be further noted that for specific implementation processes of the fifth transceiver module, the sixth transceiver module, the third control module, and the second receiving module, refer to detailed descriptions in the embodiments in FIG. 6 and FIG. 7. For brevity of the specification, details are not described herein again.

The fifth transceiver module and the sixth transceiver module mentioned in some embodiments of this application may be a transceiver interface, a transceiver circuit, a transceiver, or the like. The second receiving module may be a receiving interface, a receiving circuit, a receiver, or the like. The third control module may be one or more processors.

Based on a same inventive concept as that of the foregoing method, an embodiment of this application provides a communications apparatus. The communications apparatus may be consistent with the fourth communications apparatus in the foregoing embodiments.

Figure 11:
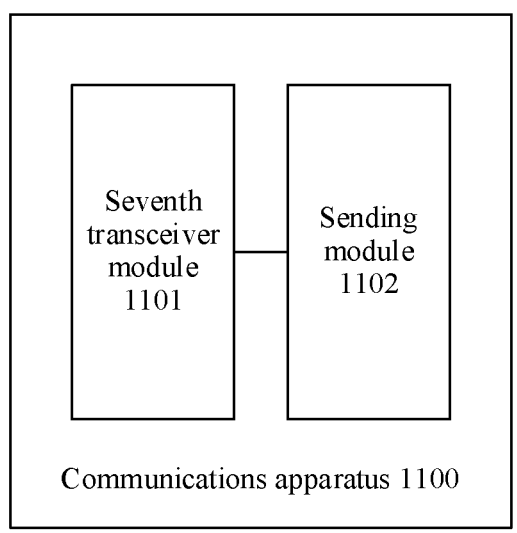
FIG. 11 is a schematic structural diagram 4 of a communications apparatus according to an embodiment of this application.

FIG. 11 is a schematic structural diagram 4 of a communications apparatus according to an embodiment of this application. Referring to FIG. 11, the communications apparatus 1100 may include: a seventh transceiver module 1101, configured to: after receiving a second data frame from a second communications apparatus in an AP through a second channel, send a first acknowledgment message to the second communications apparatus through the second channel; and a sending module 1102, configured to forward the received second data frame to a kernel of a STA.

In some possible implementations, the apparatus further includes: an eighth transceiver module, configured to send a third notification message to a third communications apparatus after the seventh transceiver module receives the second data frame from the second communications apparatus through the second channel, where the third notification message is used to instruct the third communications apparatus to discard a first data frame received through a first channel.

In some possible implementations, the apparatus further includes an eighth transceiver module and a fourth control module, where the eighth transceiver module is configured to receive a fourth notification message from a third communications apparatus, where the fourth notification message indicates that the third communications apparatus has received a first data frame; and the fourth control module is configured to control, in response to the fourth notification message, the seventh transceiver module to discard the second data frame when receiving the second data frame.

In some possible implementations, the sending module is further configured to: delete a second identifier of the second data frame; and forward the second data frame obtained after the deletion to the kernel.

It should be further noted that for specific implementation processes of the seventh transceiver module, the sending module, the eighth transceiver module, and the fourth control module, refer to detailed descriptions in the embodiments in FIG. 5 to FIG. 7. For brevity of the specification, details are not described herein again.

The seventh transceiver module and the eighth transceiver module mentioned in some embodiments of this application may be a transceiver interface, a transceiver circuit, a transceiver, or the like. The sending module may be a sending interface, a sending circuit, a sender, or the like.

The fourth control module may be one or more processors.

In an embodiment of this application, a structure of the third communications apparatus is similar to that of the fourth communications apparatus. Details are not described herein again.

Based on a same inventive concept as that of the foregoing method, an embodiment of this application provides an AP that is consistent with the AP in any one of the foregoing embodiments.

Figure 12:
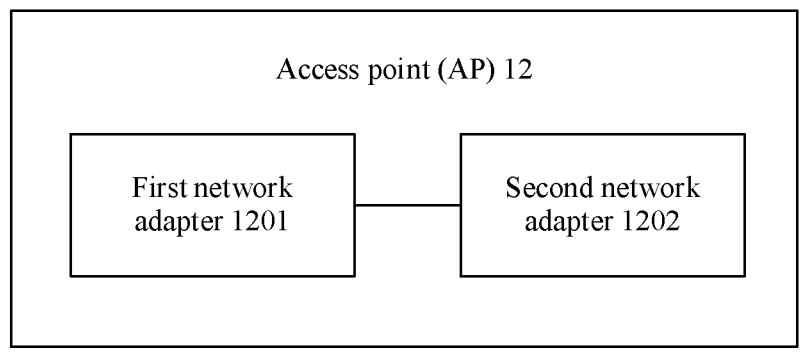
FIG. 12 is a schematic structural diagram of an AP according to an embodiment of this application.

FIG. 12 is a schematic structural diagram of an AP according to an embodiment of this application. Referring to FIG. 12, the AP 12 may include a first network adapter 1201 and a second network adapter 1202. The first network adapter and the second network adapter are configured to perform the data transmission method on a side of the AP according to any one of the foregoing embodiments.

In actual application, the first network adapter and the second network adapter may be physically integrated and encapsulated together, or may be physically separated and separately encapsulated. This is not specifically limited in this embodiment of this application.

In an embodiment of this application, the first network adapter may include a first communications interface that communicates with a kernel of the AP, a second communications interface that communicates with the second network adapter, a third communications interface that communicates with a third network adapter in a STA, and a first processor. The first communications interface, the second communications interface, the third communications interface, and the first processor are configured to perform the data transmission method according to any one of the foregoing embodiments.

Similarly, the second network adapter may include a fourth communications interface that communicates with the kernel of the AP, a fifth communications interface that communicates with the first network adapter, a sixth communications interface that communicates with a fourth network adapter in the STA, and a second processor. The fourth communications interface, the fifth communications interface, the sixth communications interface, and the second processor are configured to perform the data transmission method according to any one of the foregoing embodiments.

Based on a same inventive concept as that of the foregoing method, an embodiment of this application provides a STA that is consistent with the STA in any one of the foregoing embodiments.

Figure 13:
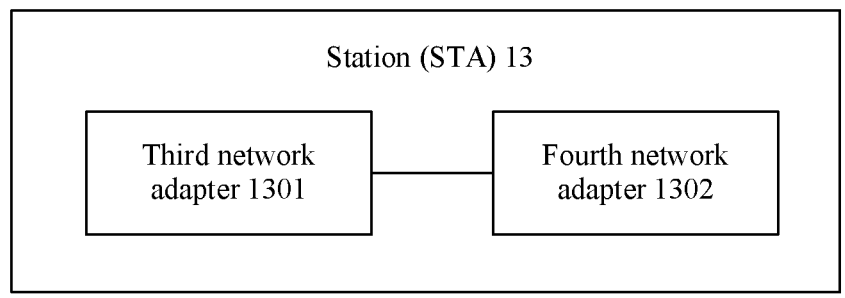
FIG. 13 is a schematic structural diagram of a STA according to an embodiment of this application.

FIG. 13 is a schematic structural diagram of a STA according to an embodiment of this application. Referring to FIG. 13, the STA 13 may include a third network adapter 1301 and a fourth network adapter 1302. The third network adapter and the fourth network adapter are configured to perform the data transmission method on a side of the STA according to any one of the foregoing embodiments.

In actual application, the first network adapter and the second network adapter may be physically integrated and encapsulated together, or may be physically separated and separately encapsulated. This is not specifically limited in this embodiment of this application.

In an embodiment of this application, the third network adapter may include a seventh communications interface that communicates with a kernel of the STA, an eighth communications interface that communicates with the fourth network adapter, a ninth communications interface that communicates with a first network adapter in an AP, and a third processor. The seventh communications interface, the eighth communications interface, the ninth communications interface, and the third processor are configured to perform the data transmission method according to any one of the foregoing embodiments.

Similarly, the fourth network adapter may include a tenth communications interface that communicates with the kernel of the STA, an eleventh communications interface that communicates with the third network adapter, a twelfth communications interface that communicates with a second network adapter in the AP, and a fourth processor. The tenth communications interface, the eleventh communications interface, the twelfth communications interface, and the fourth processor are configured to perform the data transmission method according to any one of the foregoing embodiments.

Based on a same inventive concept as that of the foregoing method, an embodiment of this application provides a computer-readable storage medium. The computer-readable storage medium stores an instruction. When the instruction is run on a computer, the computer-readable storage medium is configured to perform the data transmission method according to one or more of the foregoing embodiments.

Based on a same inventive concept as that of the foregoing method, an embodiment of this application provides a computer program or a computer program product. When the computer program or the computer program product is executed on a computer, the computer is enabled to implement the data transmission method according to one or more of the foregoing embodiments.

Based on a same inventive concept as that of the foregoing method, an embodiment of this application provides a communications system, including the AP according to any one of the foregoing embodiments and the STA according to any one of the foregoing embodiments.

In the several embodiments provided in this application, it should be understood that the disclosed apparatus and method may be implemented in other manners. For example, the described apparatus embodiment is merely an example. For example, the division into unit is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing apparatus, refer to a corresponding process in the foregoing method embodiments, and details are not described herein again.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A data transmission method, wherein an access point (AP) comprises a first communications apparatus and a second communications apparatus, a first channel is established between the first communications apparatus and a third communications apparatus of a station STA, a second channel is established between the second communications apparatus and a fourth communications apparatus of the STA, and the first channel and the second channel are channels in different frequency bands; and the method comprises:
   after failing to send a first data frame to the third communications apparatus through the first channel, retransmitting, by the first communications apparatus, the first data frame, and sending a second data frame to the second communications apparatus,
   wherein the first data frame and the second data frame are a same data frame;
   receiving, by the first communications apparatus, a first notification message sent by the second communications apparatus, wherein the first notification message indicates that the second communications apparatus successfully sends the second data frame to the fourth communications apparatus through the second channel; and
   stopping, by the first communications apparatus in response to the first notification message, sending the first data frame.

2. The method according to claim 1, wherein the stopping, by the first communications apparatus in response to the first notification message, sending the first data frame comprises:
   deleting, by the first communications apparatus in response to the first notification message, the first data frame in a sending queue corresponding to the first communications apparatus; or
   stopping retransmission of the first data frame by the first communications apparatus on the first channel in response to the first notification message.

3. The method according to claim 1, wherein the method further comprises:
   receiving, by the first communications apparatus, the first data frame sent by a kernel of the AP; and
   adding, by the first communications apparatus, a first identifier to the first data frame, wherein the first identifier uniquely indicates the first data frame, and the first identifier of the first data frame is the same as a second identifier of the second data frame.

4. The method according to claim 3, wherein the first identifier is a sequence number of the first data frame.

5. A data transmission method, wherein an access point (AP) comprises a first communications apparatus and a second communications apparatus, a first channel is established between the first communications apparatus and a third communications apparatus of a station (STA), a second channel is established between the second communications apparatus and a fourth communications apparatus of the STA, and the first channel and the second channel are channels in different frequency bands; and the method comprises:
   receiving, by the second communications apparatus, a second data frame, wherein the second data frame is sent by the first communications apparatus when the first communications apparatus retransmits a first data frame to the third communications apparatus through the first channel, and the first data frame and the second data frame are a same data frame;
   sending, by the second communications apparatus, the second data frame to the fourth communications apparatus through the second channel;
   receiving, by the second communications apparatus, a first acknowledgment message from the fourth communications apparatus through the second channel, wherein the first acknowledgment message indicates that the fourth communications apparatus receives the second data frame through the second channel; and
   sending, by the second communications apparatus, a first notification message to the first communications apparatus in response to the first acknowledgment message, wherein the first notification message is used to instruct the first communications apparatus to stop sending the first data frame.

6. A communications apparatus, comprising:
   a first transceiver configured to retransmit a first data frame after failing to send the first data frame to a third communications apparatus of a station (STA) through a first channel;
   a second transceiver, configured to send a second data frame to a second communications apparatus, wherein the first data frame and the second data frame are a same data frame; and further configured to receive a first notification message sent by the second communications apparatus, wherein the first notification message indicates that the second communications apparatus successfully sends the second data frame to a fourth communications apparatus of the STA through a second channel, and the first channel and the second channel are channels in different frequency bands; and
   a first controller, configured to stop, in response to the first notification message, sending the first data frame.

7. The communication apparatus according to claim 6, wherein the first controller is configured to delete, in response to the first notification message, the first data frame in a sending queue corresponding to the communications apparatus; or the first controller is configured to stop retransmission of, in response to the first notification message, the first data frame on the first channel.

8. The communication apparatus according to claim 6, wherein the communication apparatus further comprises: a first receiver, configured to: receive the first data frame sent by a kernel of an access point (AP), and add a first identifier to the first data frame, wherein the first identifier uniquely indicates the first data frame, and the first identifier of the first data frame is the same as a second identifier of the second data frame.

9. A communications apparatus, comprising:
   a third transceiver, configured to receive a second data frame, wherein the second data frame is sent by a first communications apparatus of an access point (AP) when the first communications apparatus retransmits a first data frame to a third communications apparatus of a station (STA) through a first channel, and the first data frame and the second data frame are a same data frame;
   a fourth transceiver, configured to send the second data frame to a fourth communications apparatus of the STA through a second channel; and further configured to receive a first acknowledgment message from the fourth communications apparatus through the second channel, wherein the first acknowledgment message indicates that the fourth communications apparatus receives the second data frame through the second channel, and the first channel and the second channel are channels in different frequency bands; and a second controller, configured to send a first notification message to the first communications apparatus in response to the first acknowledgment message, wherein the first notification message is used to instruct the first communications apparatus to stop sending the first data frame.

\* \* \* \* \*